April 26, 1932.  C. M. McCORD  1,855,918
BATTERY PLATE PASTING MACHINE
Filed Oct. 29, 1930  3 Sheets-Sheet 1

Inventor
Claude M. McCord
by Rippey & Kingsland
His Attorneys

April 26, 1932.  C. M. McCORD  1,855,918
BATTERY PLATE PASTING MACHINE
Filed Oct. 29, 1930  3 Sheets-Sheet 2
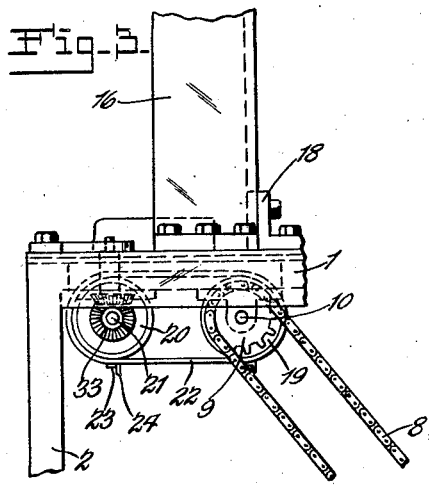
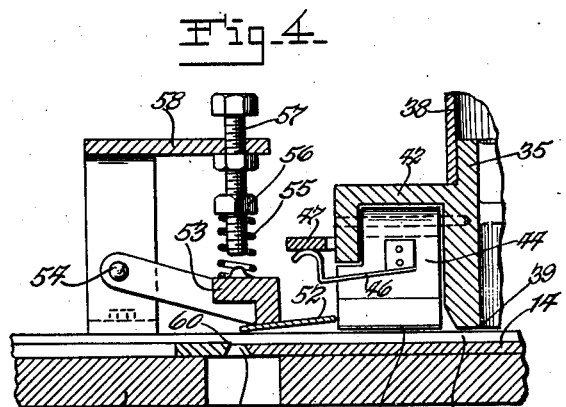
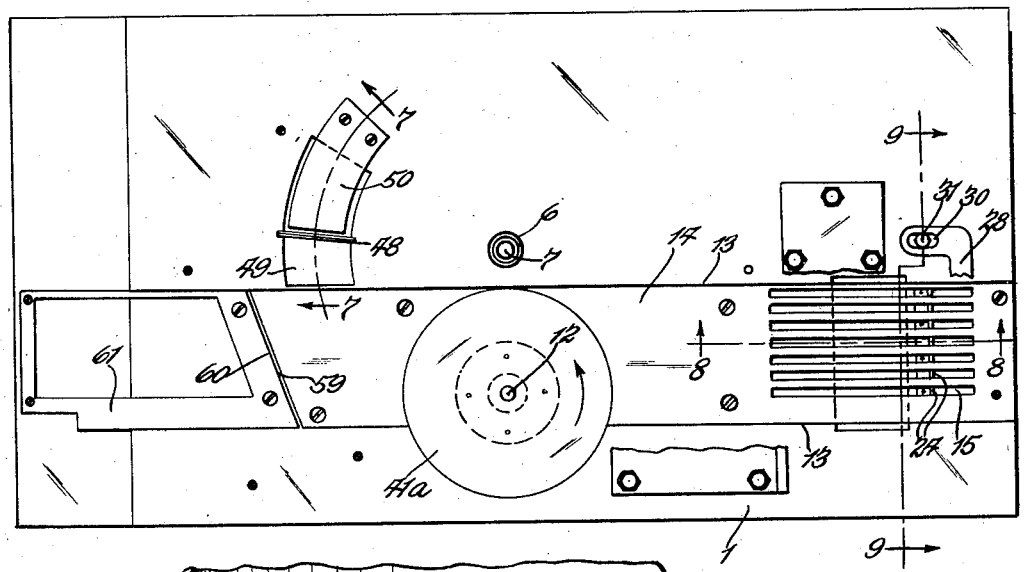
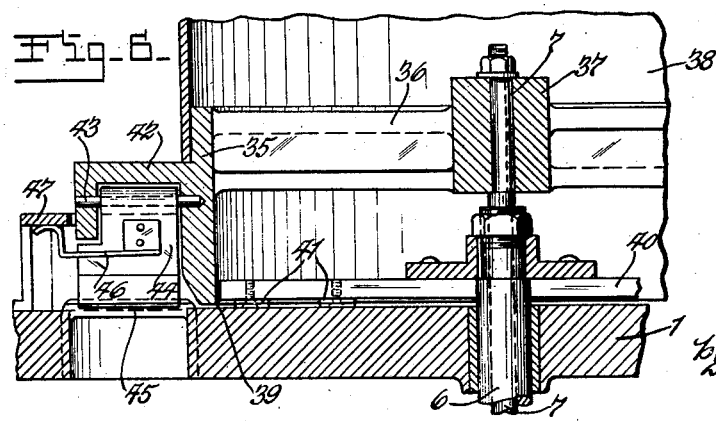

April 26, 1932.   C. M. McCORD   1,855,918
BATTERY PLATE PASTING MACHINE
Filed Oct. 29, 1930   3 Sheets-Sheet 3
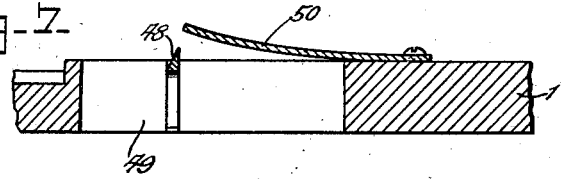
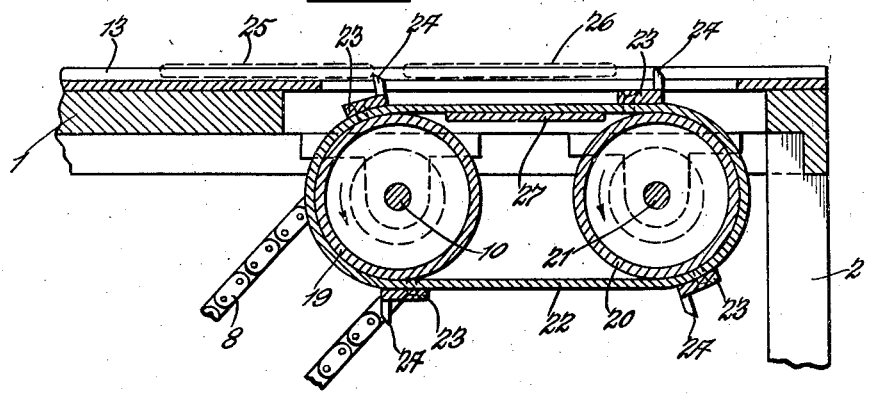
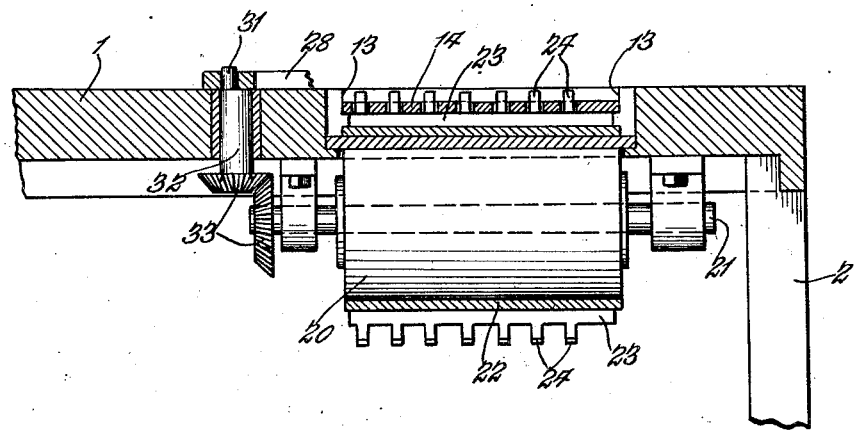
Inventor
Claude M. McCord
by Rippey & Kingsland
His Attorneys Patented Apr. 26, 1932

1,855,918

UNITED STATES PATENT OFFICE

CLAUDE M. McCORD, OF MEMPHIS, TENNESSEE

BATTERY PLATE PASTING MACHINE

Application filed October 29, 1930. Serial No. 491,852.

This invention relates to battery plate pasting machines; and an object of the invention is to provide a machine having mechanism for moving battery plates along or through the machine, and mechanism operating automatically during the movement of the battery plates along and through the machine to apply the paste to the battery plates and to remove from the battery plates any excess amount of paste and to discharge the battery plates with approximately uniform amounts of paste applied thereto.

The application of paste to battery plates by use of trowels and other similar implements is a slow procedure and the results are not uniform because of the difficulty of performing uniform manual operations. The result is that the expense incurred in the manual application of paste to battery plates is unduly high and the results are imperfect.

Another object of the invention is to provide a machine that operates to apply paste to battery plates in rapid succession and faster than it is possible to do by hand, and which produces uniform results by applying uniform amounts of paste to the respective plates.

Various other objects of the invention will appear from the following description, reference being made to the accompanying drawings, in which—

Fig. 3 is a detail view showing part of the mechanism for moving the battery plates successively through the machine.

Figure 1:
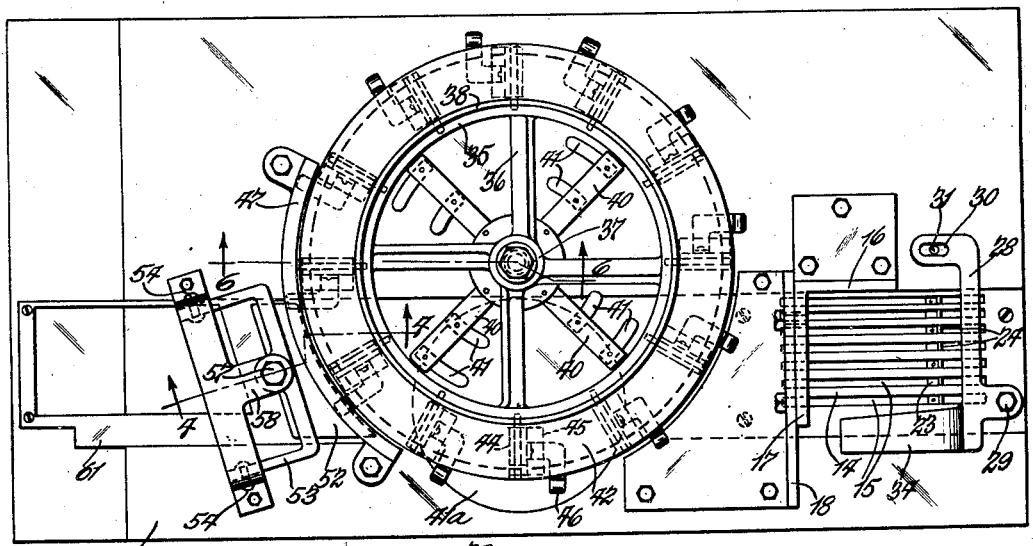
Fig. 1 is a top plan view of my improved battery plate pasting machine.
Figure 2:
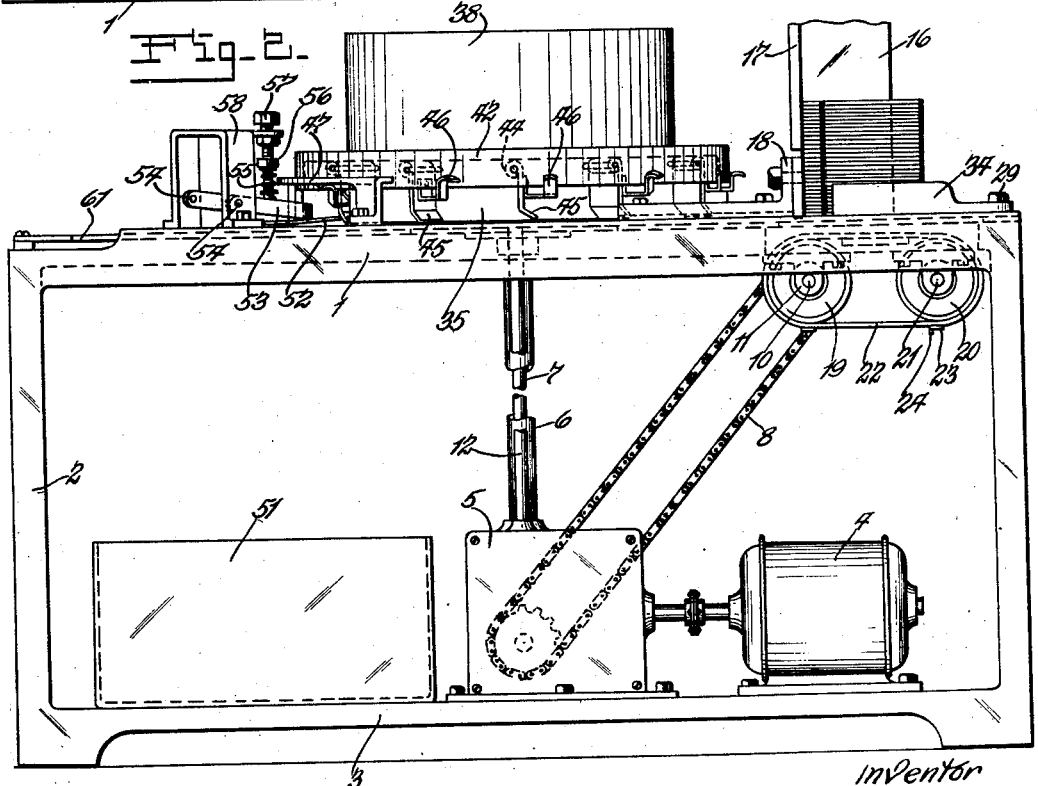
Fig. 2 is a side elevation.

Fig. 4 is an enlarged sectional view approximately on the line 4—4 of Fig. 1, showing the device for pressing the paste into the openings and interstices in the battery plates and the device for removing excess amounts of paste from the battery plates.

Fig. 5 is a top plan view of the table of the machine having most of the superimposed mechanism removed.

Fig. 6 is an enlarged sectional view approximately on the line 6—6 of Fig. 1, showing the devices for pressing the paste into the battery plates and then removing excess amounts of the adhering paste from the battery plates.

Fig. 7 is an enlarged sectional view approximately on the line 7—7 of Fig. 5, showing further details of the device for removing adhering paste from the presser members of the machine.

Fig. 8 is an enlarged vertical sectional view approximately on the line 8—8 of Fig. 5, showing the battery plate actuating device.

Fig. 9 is an enlarged vertical sectional view approximately on the line 9—9 of Fig. 5, showing additional features of the battery plate actuator and also showing the means for alining the battery plates in proper position for movement by the actuator.

The driven mechanism that operates to move the plates through the machine to apply the paste to the battery plates and to remove excess amounts of paste from the plates is supported above the frame of the machine comprising a table 1 and supporting frame structure 2. The driving mechanism is supported on the lower frame part 3 and comprises a motor 4 and driving gearing enclosed in a gear housing 5. The gearing that is enclosed in the gear housing 5 drives at high speed a vertical tubular shaft 6 and drives at low speed a vertical shaft 7 that extends upwardly through the shaft 6. The shafts 6 and 7 are thus arranged in concentric relationship and the device that is driven by the shaft 6 is operated at much greater speed than is the device that is driven by the shaft 7. The gearing for driving these shafts at these speeds is unimportant because said shafts constitute an exemplification of means for driving mechanisms at different speeds irrespective of the type of gearing used to rotate said shafts and with which the present invention is not concerned.

The gearing that is enclosed in the housing 5 also operates a chain 8 that engages a sprocket wheel 9 attached to a shaft 10 rotatively supported in bearings 11 attached to the under side of the table 1.

The gearing that is enclosed in the housing 5 also rotates a vertical shaft 12 spaced laterally from the shafts 6 and 7.

The table 1 has in its upper surface a longitudinal groove bordered by side walls 13 and having a bottom wall 14. Near one end of the bottom wall 14 a series of longitudinal slots 15 are formed. A gage for stacks of battery plates is provided adjacent to the slots 15 and comprises a vertical angular bar rigidly attached to the table 1 and having one flange 16 in vertical continuation of one of the groove walls 13 and having its other flange 17 extending across the groove formed between the walls 13. Battery plates are stacked upon the bottom wall 14 and between the side walls 13 of the groove with their forward ends abutting against the gage flange 17 and their inner edges abutting against the gage flange 16. Since the lower end of the flange 17 does not extend into the groove, it is possible for the lowermost battery plate to be moved along the groove and below the lower end of the gage flange 17, the battery plate being guided by the walls 13 of the groove. A cooperating gage member 18 is attached to the table 1 and to the gage flange 17. The gage member 18 extends across the groove that is between the walls 13 and, obviously, may be adjusted upwardly or downwardly by the use of familiar spacers so as to permit the passage of battery plates of different thicknesses and prevent the passage of more than one battery plate at a time.

A pulley 19 is rigidly attached to the shaft 10 and cooperates with a pulley 20 rigid on a shaft 21 to support the actuator that moves the battery plates through the machine. This actuator comprises a belt 22 mounted on the pulleys 19 and 20 and has a series of transverse bars 23 rigidly attached thereto in spaced relationship, and each provided with a series of fingers 24 projecting angularly therefrom so as to project through the slots 15 and engage the rear edges of the lowermost battery plates successively. These bars 23 are spaced apart a distance somewhat greater than the length of the battery plates, so that there is no interference, the battery plate that is actuated by each bar being disengaged before the next following battery plate is moved into contact therewith. This will be understood by reference to Fig. 8 of the drawings wherein two battery plates are indicated in broken lines. As there shown, the battery plate 25 is in advance and is about to be disengaged by the fingers 24, while the next adjacent battery plate 26 has not yet been engaged by the fingers 24 of the next following bar 23. The upper portion of the belt 22 between the pulleys 19 and 20 operates over a support 27 which prevents downward bending of the upper portion of said belt in such a way as to disengage the fingers 24 from the battery plates.

My invention comprises an alining device that is operated automatically by the machine to aline the battery plates so as to press the inner edges thereof against the gage 16 and thus position the battery plates for proper longitudinal movement along the guide slot. A lever comprising an arm 28 is mounted on a pivot 29 (Fig. 1) and has a slot 30 for receiving an eccentric extension 31 from a short shaft 32 rotatively supported by the table 1. The shaft 32 is rotated by gearing 33 driven by the shaft 21. Since the extension 31 is eccentric of the axis of the shaft 32, it operates as a crank to oscillate the lever 28. On the end of the lever 28 opposite from the slot 30 an arm 34 is formed. The inner edge of the arm 34 is adjacent to the stack of battery plates mounted over the slots 15 and is arranged to engage against the outer edges of the battery plates at each operation of said arm 34, and thus force the battery plates inwardly into proper vertical alinement for movement along the guide slot.

A cylindrical member 35 is supported by spokes 36 projecting from a hub 37 rigidly attached to the upper end of the shaft 7. These spokes have inclined lower surfaces so that, when they move forwardly, they will press downwardly the contents of the member 35. A cylindrical container 38 is telescoped upon the upper portion of the member 35 and cooperates therewith to form a container for the paste that is applied to the battery plates. The lower end of the cylindrical member 35 is adjacent to the upper surface of the table 1 and is formed with a sharp inner corner 39 constituting a knife to scrape most of the excess paste from the upper surfaces of the battery plates moving thereunder. As before stated, the shaft 7 rotates at comparatively slow speed and, therefore, rotates the paste container at slow speed.

The rapidly rotating tubular shaft 6 has a series of arms 40 attached to its upper end and located only slightly above the upper surface of the table 1. These arms are rotated at much greater speed than the paste container and, therefore, at much greater speed than the spokes 36 which support the paste container and which press the paste downwardly therein. The arms 40 are substantially non-resilient and each of said arms supports a number of spring elements 41 which, by their resiliency, press the paste downwardly into and through the openings and interstices in the battery plates as the battery plates are moved along the guide groove. These arms 40 move at considerably greater speed than the battery plates are moved, so that the desired pressing and pasting action is obtained by the resilient members 41.

It is now clear that, by the construction shown and described, I am enabled to locate the guide groove laterally from the axis of the paste container and paste applying devices and thus am able to locate the driving mechanism for the shafts below the table instead of supporting the driving mechanism above the table, as would be necessary if the battery plates were moved across the axis of the paste container.

The upper end of the shaft 12 has attached thereto a disc 41ª, the upper surface of which is flush with the upper surface of the bottom wall of the guide groove. This disc 41ª is rotated at comparatively rapid speed and functions as a trowel to wipe the paste across the lower surfaces of the battery plates and causes the paste to fill all of the interstices and spaces. This disc 41ª cooperates with the pressure devices 41 to effect complete filling of the holes and spaces and interstices in and through the battery plates. In addition to the pasting action described, this disc 41ª, which rotates at high speed in the direction of the arrow shown on the disc in Fig. 5, assists in propelling and moving the battery plates along the guide groove. This rotating disc overcomes the resistance of the paste to the movement of the plates through the machine, and this propelling action of the disc is a chief function of said disc.

As the battery plates are moved one behind the other along the guide groove and below the paste container, most of the excess amount of paste is removed therefrom as the battery plates move from below the paste container. This is because the rotating knife 39 scrapes off the surplus paste and is, itself, kept clean by the more rapidly rotating arms 40 which have their ends adjacent to said knife 39. Thus, adhesion of excess amounts of paste to the knife 39 is prevented, and said knife 39 removes most of the excess amount of paste from the battery plates.

The member 35 is formed with an external angular flange 42 which cooperates with said member 35 to support a series of pins 43. Each of said pins 43 supports a trowel member comprising a plate 44 having its upper edge mounted on said pin 43 and having a rearwardly deflected lower edge 45. These trowels are moved across the battery plates as they emerge from under the member 35. Each plate 44 supports a spring arm 46 which projects laterally therefrom below and beyond the outer edge of the flange 42, so as to engage and operate against the under surface of a rigid segment 47 attached to the table 1, and thereby cause the edges 45 of said trowels to scrape excess paste from the upper surfaces of the battery plates, to apply additional pressure to the paste so as to cause the paste to penetrate and enter and fill all of the spaces and interstices in the battery plates preparatory to the final operations of the machine. This segment 47 extends across the guide groove adjacent to the exit portion thereof from the paste container. After the trowels move beyond the battery plates, said trowels are moved over a scraper 48 supported in a slot 49 in the table 1 and projecting above the upper surface of the table. A spring scraper 50 is attached to the table 1 and has its free end curving upwardly adjacent to the scraper 48 and is pressed downwardly as the trowels move thereover, because the trowel springs 46 are engaged under the segment 47 and prevent upward movement of said trowels by the spring scraper 50. These scrapers 48 and 50 cooperate to remove nearly all paste from the trowels and to prevent the adhesion of paste to each other, causing the paste to drop through the slot 49 into a pan 51 mounted on the frame part 3 below said slot 49 for that purpose.

As the battery plates continue to move along the guide slot, they are moved under an inclined plate 52 (Fig. 4) supported by a bail 53. The bail 53 is supported by pivots 54 and is pressed downwardly by a spring 55. The lower end of the spring 55 is seated on the bail 53 and the upper end of said spring is against an adjustable abutment 56 screwed on a bolt 57 which is screwed through a hole in a support 58. These parts 56 and 57 constitute means for varying the tension of the spring 55. The lower edge of the plate 52 is thus held pressed against the upper surface of the table. This plate 52 extends across the guide groove along which the battery plates are moved.

The lower edge of the plate 52 is above a slot 59 through the bottom wall 14 of the guide slot. At one side of said slot 59 a scraper edge 60 is formed which is slightly above the upper surface of the bottom plate 14 at the opposite side of said slot. Thus, the lower edge of the plate 52 cooperates with the scraper edge 60 to remove all excess amounts of paste from the battery plates and to discharge the paste downwardly through the slot 59 into the pan 51.

In operation, a stack of battery plates is placed upon the bottom wall 14 of the guide groove above the slots 15. A sufficient amount of paste is placed in the container 38. When the motor 4 is started, the lever 28—34 is operated to aline the lowermost battery plates for movement along the guide slot. The actuator belt 22 moves the lowermost battery plates successively from the stack of battery plates, causing each successive battery plate to abut against the rear edge of the next preceding battery plate in due course of movement, and thus form a continuous train of battery plates along the guide slot.

The driving shafts 6 and 7 are rotated at different speeds, the driving shaft 6 being rotated at high speed and the shaft 7 rotated at low speed. The shaft 6 operates the arms 40 and the members 41 attached thereto at rapid speed, thereby causing the members 41 to press the paste into and through the openings and interstices in the battery plates. The paste is fed downwardly in the container by the inclined spokes 36. As the battery plates pass under the rotating knife 39, most of the excess paste is removed from the battery plates and said knife 39 is kept clean by the adjacent ends of the more rapidly rotating arms 40. As the battery plates pass from under the paste container, they are acted upon by the trowel devices in the manner before described, with the result that said trowel devices smooth the paste and apply additional pressure thereto so as to complete the filling of all openings and interstices in the plates. The trowel devices are themselves cleaned and adhering paste is removed therefrom by the scraping devices 48 and 50.

As the plates are pushed along the guide groove, they are moved successively between the scrapers comprising the lower edge of the plate 52 and the scraping edge 60. This action removes all excess paste from both sides of the battery plates and discharges the excess paste through the slot 59 into the pan 51.

The battery plates are then moved onto an open frame 61 which supports the intermediate portions of the plates out of contact with the bottom of the guide groove and thus facilitates the removal of the plates.

It is now clear that my invention obtains all of its intended objects in a highly efficient, rapid and economical manner. By use of this machine, a single operator may produce a much greater output than can be produced by many operators using hand trowels. The container 38 may be easily detached from its supporting member and the supporting member may be easily detached from the shaft 7 to permit removal of all paste from the machine whenever the machine is stopped. The invention is capable of a wide number of variations within the scope of equivalent limits without departure from the nature and principle thereof. I contemplate such variations as may be deemed desirable and do not restrict myself in any unessential particulars, but what I claim and desire to secure by Letters Patent is:—

1. A machine of the character described comprising a support, rotary mechanism mounted above said support, means for operating said rotary mechanism to press paste into and through the openings and interstices in battery plates located between said mechanism and said support, a rotary container for delivering paste to said mechanism and for removing a part of the excess paste from the battery plates, and means for guiding the battery plates along said support laterally from the axis of said rotary mechanism.

2. A machine of the character described comprising a support, rotary mechanism mounted above said support, means for operating said rotary mechanism to press paste into and through the openings and interstices in battery plates located between said mechanism and said support, a rotary container for delivering paste to said mechanism and for removing a part of the excess paste from the battery plates, means for guiding the battery plates along said support laterally from the axis of said rotary mechanism, and a device for moving the paste at the under sides of the battery plates.

3. A machine of the character described comprising a support, rotary mechanism mounted above said support, means for operating said rotary mechanism to press paste into and through the openings and interstices in battery plates located between said mechanism and said support, a rotary container for delivering paste to said mechanism and for removing a part of the excess paste from the battery plates, means for guiding the battery plates along said support laterally from the axis of said rotary mechanism, a device for moving the paste at the under sides of the battery plates during the time that the paste is being pressed into the openings and interstices in the battery plates by said mechanism as aforesaid, and mechanism for removing excess paste from the battery plates.

4. A machine of the character described comprising a support, a guide for battery plates on said support, a rotary container for delivering paste to the battery plates and for removing a part of the excess paste therefrom, vertically spaced rotary devices between which the battery plates move along said guide, shafts for rotating said devices, and means in connection with the upper rotary devices for pressing paste into and through the openings and interstices in the battery plates between said rotary devices.

5. A machine of the character described comprising a support, a guide for battery plates on said support, a rotary container for delivering paste to the battery plates and for removing a part of the excess paste therefrom, vertically spaced rotary devices between which the battery plates move along said guide, shafts for rotating said devices, means in connection with the upper rotary devices for pressing paste into and through the openings and interstices in the battery plates between said rotary devices, and devices for removing excess paste from the battery plates after the openings and interstices in the battery plates have been filled with paste as aforesaid.

6. A machine of the character described comprising a support, a rotary container above said support for containing battery paste, mechanism for moving battery plates along said support below said container, devices operating within said container for pressing paste into and through the openings and interstices in the battery plates and for preventing adhesion of paste to the lower edge of said container, and a scraping edge in connection with the lower portion of said container for scraping excess paste from the battery plates.

7. A machine of the character described comprising a support, a rotary container above said support for containing battery paste, mechanism for moving battery plates along said support below said container, devices operating within said container for pressing paste into and through the openings and interstices in the battery plates and for preventing adhesion of paste to the lower edge of said container, a scraping edge in connection with the lower portion of said container for scraping excess paste from the battery plates, and devices beyond said container for applying additional pressure to the paste and removing additional excess portions thereof.

8. A machine of the character described comprising a support, a rotary container above said support for containing battery paste, mechanism for moving battery plates along said support below said container, devices operating within said container for pressing paste into and through the openings and interstices in the battery plates and for preventing adhesion of paste to the lower edge of said container, a scraping edge in connection with the lower portion of said container for scraping excess paste from the battery plates, devices beyond said container for applying additional pressure to the paste and removing additional excess portions thereof, and devices beyond said last named devices for removing final excess portions of paste from said battery plates.

9. A machine of the character described comprising a guide for battery plates, a disc forming a part of the bottom of said guide and rotative about an axis that is eccentric with respect to said guide, mechanism for rotating said disc to assist in moving the battery plates along said guide and causing paste completely to fill openings and interstices in the battery plates, and mechanism for pressing paste into said openings and interstices.

10. A machine of the character described comprising a guide along which battery plates are movable, a disc at the bottom of said guide and rotative about an axis laterally from the center of said guide, mechanism for rapidly rotating said disc to assist in propelling the battery plates along said guide and causing paste completely to fill openings and interstices in the battery plates, and rotary mechanism for delivering paste to battery plates moving along said guide.

11. A machine of the character described comprising a guide along which battery plates are movable, a disc forming a part of the bottom of said guide and being rotative about an axis laterally from the center of the guide, mechanism for pressing paste into the openings and interstices in battery plates moving along said guide, and mechanism for rapidly rotating said disc to propel the battery plates along said guide.

12. A machine of the character described comprising a guide along which battery plates are movable, a disc forming a part of the bottom of said guide and being rotative about an axis laterally from the center of the guide, mechanism for pressing paste into the openings and interstices in battery plates moving along said guide, mechanism for rapidly rotating said disc to propel the battery plates along said guide, and devices for removing excess paste from the battery plates.

13. A machine of the character described comprising a guide along which battery plates are movable, mechanism for moving a row of battery plates along said guide, mechanism for pressing paste into the openings and interstices in the battery plates moving along said guide, and a rotary disc forming a part of the bottom of said guide and rotative about an axis laterally from the center of said guide for moving the battery plates along the guide and causing the paste completely to fill openings and interstices in the battery plates.

14. A machine of the character described comprising a guide along which battery plates are movable, mechanism for moving a row of battery plates along said guide, mechanism for pressing paste into the openings and interstices in the battery plates moving along said guide, a rotary disc forming a part of the bottom of said guide and rotative about an axis laterally from the center of said guide for moving the battery plates along the guide and causing the paste completely to fill openings and interstices in the battery plates, and mechanism for removing excess paste from the battery plates.

15. A machine of the character described comprising an elongated guide for a longitudinal series of battery plates, a paste container extending across said guide and having an open lower end for discharging paste into said guide and rotative about an axis spaced laterally from said guide, a disc forming a part of the bottom of said guide below the open lower end of said container and rotative about an axis that is eccentric with respect to said guide and with respect to the axis of said container, mechanism for rotating said disc to assist in moving the battery plates along said guide and causing paste completely to fill openings and interstices in the battery plates, and resilient members within said container for pressing paste into said openings and interstices in the battery plates.

16. A machine of the character described comprising an elongated guide for a longitudinal series of battery plates, a paste container extending across said guide and having an open lower end for discharging paste into said guide and having its axis spaced laterally from said guide, a disc forming a part of the bottom of said guide below the open lower end of said container and rotative about an axis that is adjacent to the opposite side of said guide from the axis of said container, mechanisms for rotating said container and said disc, and devices supported within said container for pressing paste into the openings and interstices in the battery plates moving across said disc.

17. A machine of the character described comprising mechanism for moving a longitudinal series of battery plates, mechanism for pressing paste into and through the openings and interstices in the battery plates, a rotary disc for supporting and assisting in moving the battery plates below said mechanism, and a rotary element for scraping excess paste from the battery plates during movement of the battery plates beyond said disc.

18. A machine of the character described comprising mechanism for moving a longitudinal series of battery plates, mechanism for pressing paste into and through the openings and interstices in the battery plates, a rotary disc for supporting and assisting in moving the battery plates below said mechanism, a rotary element for scraping excess paste from the battery plates during movement of the battery plates beyond said disc, devices for troweling and pressing the paste into the openings and interstices in the battery plates and removing an additional portion of the paste from the battery plates, and means effective thereafter for removing the remaining excess paste from the battery plates.

19. A machine of the character described comprising a guide for battery plates, mechanism for moving battery plates along said guide, a disc forming a part of the bottom of said guide and rotating about an axis that is eccentric with respect to said guide, mechanism for rotating said disc to assist in moving the battery plates along said guide and causing paste completely to fill openings and interstices in the battery plates, resilient members for pressing paste into the openings and interstices in the battery plates on said disc, and mechanism for operating said resilient members.

20. A machine of the character described comprising a guide for battery plates, mechanism for moving battery plates along said guide, a disc forming a part of the bottom of said guide and rotating about an axis that is eccentric with respect to said guide, mechanism for rotating said disc to assist in moving the battery plates along said guide and causing paste completely to fill openings and interstices in the battery plates, resilient members for pressing paste into the openings and interstices in the battery plates on said disc, mechanism for operating said resilient members, and rotary devices for removing excess paste from the battery plates passing along said disc and said resilient members.

21. A machine of the character described comprising a support, mechanism for moving battery plates along said support, a disc forming a part of the bottom of said support and rotative about an axis that is eccentric with respect to the space along which the battery plates move, mechanism for rotating said disc to assist in moving the battery plates along said support and causing paste completely to fill openings and interstices in the battery plates, mechanism for pressing paste into the openings and interstices in the battery plates on said support and on said disc, mechanism operating successively on the battery plates for successively removing portions of excess paste from the battery plates, and an open frame for receiving the battery plates from said supports and facilitating removal of the battery plates from the machine.

22. A machine of the character described comprising a support, a guide for guiding battery plates along said support, a pair of concentric rotary shafts at one side of said support, a container for paste supported and rotated by one of said shafts and having an open lower end extending over said support, presser devices rotated by the other shaft and rotated at a different speed than the rotation of said container, a disc forming a part of the bottom of said guide and rotative about an axis that is eccentric with respect to the axis of said guide and the axes of said shafts and said disc extending below the open lower end of said container, and mechanism for rotating said disc to assist in moving the battery plates along said guide and causing paste completely to fill openings and interstices in the battery plates.

23. A machine of the character described comprising a support, a guide for guiding battery plates along said support, a pair of rotary shafts at one side of said guide, mechanisms supported and operated by said shafts respectively for containing and pressing paste into and through the openings and interstices in battery plates in said guide below said mechanisms, a disc forming a part of the bottom of said guide below said mechanisms and rotative about an axis that is eccentric with respect to the axis of said guide and the axes of said shafts, and mechanism for rotating said disc to assist in moving the battery plates along said guide below said mechanisms and causing paste completely to fill openings and interstices in the battery plates.

24. A machine of the character described comprising a support, a guide on said support, means for vertically alining battery plates in a vertical stack of battery plates for movement along said guide, mechanism for moving the battery plates successively from said stack and along said guide, mechanism extending across said guide for compressing paste into and through the openings and interstices in the battery plates, a disc forming a part of the bottom of said guide below said last named mechanism and rotative about an axis that is eccentric with respect to the axis of said guide, and mechanism for rotating said disc to assist said first named mechanism in moving the battery plates along said guide and causing paste completely to fill openings and interstices in the battery plates.

25. A machine of the character described comprising a support, a guide on said support, means for vertically alining battery plates in a vertical stack of battery plates for movement along said guide, mechanism for moving the battery plates successively from said stack and along said guide, mechanism extending across said guide for compressing paste into and through the openings and interstices in the battery plates, a disc forming a part of the bottom of said guide below said last named mechanism and rotative about an axis that is eccentric with respect to the axis of said guide, mechanism for rotating said disc to assist said first named mechanism in moving the battery plates along said guide and causing paste completely to fill openings and interstices in the battery plates, a rotary device for removing excess paste from the battery plates passing beyond said compressing mechanism and said disc, and movable trowels for operating on the battery plates beyond said device.

26. A machine of the character described comprising a support, mechanism for moving battery plates along said support, devices for compressing paste into and through the openings and interstices in the battery plates along said support, a rotary disc forming a part of the bottom of said support below said devices and rotative about an axis laterally from the center of said support for moving the battery plates along said support and causing the paste completely to fill openings and interstices in the battery plates, a rotary scraper device for removing excess paste from the battery plates passing beyond said disc and said devices, pivotally supported trowels beyond said scraper, and means for causing said trowels to apply additional pressure to the paste in connection with the battery plates and remove portions of the excess paste from the battery plates.

27. A machine of the character described comprising a support, mechanism for moving battery plates along said support, devices for compressing paste into and through the openings and interstices in the battery plates along said support, a rotary disc forming a part of the bottom of said support below said devices and rotative about an axis laterally from the center of said support for moving the battery plates along said support and causing the paste completely to fill openings and interstices in the battery plates, a rotary scraper device for removing excess paste from the battery plates passing beyond said disc and said devices, pivotally supported trowels beyond said scraper, means for causing said trowels to apply additional pressure to the paste in connection with the battery plates and remove portions of the excess paste from the battery plates, and devices supported by said support for removing the final excess portions of paste from the battery plates after operation of said trowels as aforesaid.

CLAUDE M. McCORD.